Patented Sept. 17, 1946

2,407,813

UNITED STATES PATENT OFFICE 2,407,813

PROCESS FOR MANUFACTURE OF
SUPPORTED CATALYSTS

Harry A. Cheney, Oakland, Calif., assignor to
Shell Development Company, San Francisco,
Calif., a corporation of Delaware No Drawing. Application June 21, 1943,
Serial No. 491,723

8 Claims. (Cl. 252—253)

This invention relates to the manufacture of supported catalysts and relates more particularly to the manufacture of catalysts comprising at least one metal of group VIII in combination with activated carbon which have been found to be particularly effective in the conversion of olefinic hydrocarbons to the lower boiling of the linear polymers thereof, although they can be employed also in other types of hydrocarbon conversions.

Catalysts comprising elements of group VIII find application in a wide variety of processes, particularly those involving the conversion of hydrocarbons such as, for example, hydrogenation, polymerization, dehydrogenation, isomerization, gas pyrolysis, aromatization, etc. These metals in a limited number of cases are used per se in relatively large fragments, pieces or chunks. Most catalytic processes, however, require their usage in dispersed or finely-divided form deposited upon suitable support materials. Support materials which may be employed comprise materials of porous structure such as activated carbon, pumice, fire brick, as well as synthetically prepared or naturally-occurring siliceous or aluminous materials such as, for example, clays, bentonite, bauxite, diatomaceous earth, silica gel, Activated Alumina, active or activated blends or compounds of silica and alumina, etc. These various types of carrier materials, though individually applicable as supports for the catalyst in a number of varying reactions, are, however, not equivalent. It has been found that characteristics of the catalysts are often dependent upon the nature of the particular support material employed and that the catalytic effect of the elements of group VIII may be modified or changed by judicious selection of the particular support material combined therewith.

It has been found that catalysts comprising an element of group VIII in combination with activated carbon possess the ability of catalyzing the conversion of olefinic hydrocarbons to a product which can be made to predominate in one or several of the lower boiling of the linear polymers thereof at temperatures below about 350° C. A particularly advantageous characteristic of this catalyst combination is the ability to convert even the lower boiling of the olefinic hydrocarbons, such as ethylene and propylene, to the lower boiling of the linear polymers thereof to a degree not possessed by other types of available polymerization catalysts. Their ability to promote the conversion of ethylene and propylene to products predominating in butylene and hexylene, respectively, materials highly desirable as starting materials in the production of such products as synthetic rubber and aviation fuels, renders these catalysts exceedingly valuable. Of these catalysts those comprising cobalt and/or nickel in combination with activated carbon are particularly outstanding in their ability to effect this desirable reaction. Catalysts comprising cobalt are somewhat preferred over those comprising nickel since they enable the conversion of the olefinic hydrocarbon to the lower boiling of the linear polymers thereof at temperatures below about 250° C. and preferably not substantially in excess of about 150° C., whereas those comprising nickel generally require somewhat higher temperatures, for example, up to about 350° C., to attain equivalent results.

Methods heretofore generally employed in the preparation of these catalysts comprise the impregnation of the carrier material with a solution of a compound of an element of group VIII and subsequent heating of the resulting mixture at atmospheric pressure to effect decomposition of the deposited compound. Though variations in the method of preparing these catalysts have heretofore been disclosed, such methods have generally been handicapped by serious disadvantages. The resultant catalysts are generally lacking in uniformity with respect to activity. Another disadvantage is the often total absence of a particular characteristic such as, for example, in the case of catalysts comprising an element of group VIII and activated carbon, the ability to catalyze the conversion of olefins to the lower boiling of the linear polymers thereof.

The particular characteristic of the resultant catalyst, it has been found, is dependent not only upon the particular element of group VIII and particular support material chosen but also upon the particular compound of the element of group VIII used as a starting material. Thus, catalysts comprising cobalt and/or nickel prepared by combining an activated carbon with a salt such as the acetate and chloride of these metals and subsequent reduction of these compounds produces a catalyst possessing little, if any, ability to promote the conversion of ethylene to the lower boiling of the linear polymers thereof. On the other hand, when utilizing a salt such as, for example, a salt obtained by the interaction of an element of group VIII with an oxygen-containing mineral acid such as, for example, cobalt nitrate, nickel nitrate, etc., as starting materials, the resulting catalysts possess these desirable characteristics to a surprising degree. However, in the production of the catalyst utilizing a salt particularly prone to undergo spontaneous ignition during heating, such as the nitrates, especially when conducted on a large-scale by methods utilized heretofore, often results in a spontaneous decomposition to varying degrees of the salt, thereby not only producing materials ineffective as catalysts but presenting serious hazards. When the production of some material in the absence of marked spontaneous decomposition is attained by such methods, the resulting product nevertheless generally consists of a substantial proportion which does not possess the desired characteristic activity, and a remaining portion which is devoid to a marked degree of uniformity with respect to composition and catalytic activity. This, it is found, is due to at least a substantial degree to overheating of portions of the catalyst resulting from spontaneous ignition, which though present to a lesser and localized degree is, nevertheless, often unavoidably encountered to an undesirable extent in methods of catalyst preparation resorted to heretofore.

It is an object of the present invention to provide an improved method for the more efficient preparation of catalytic materials comprising an element of group VIII and a porous inorganic support material wherein the above disadvantages are obviated to at least a substantial degree. Another object of the invention is the provision of an improved method for the more efficient manufacture of catalysts comprising an element of group VIII in combination with activated carbon having greater uniformity with respect to composition and catalytic activity than those obtained by methods available heretofore. A still further object of the invention is the provision of an improved method for the more efficient production of catalysts comprising cobalt and/or nickel in combination with activated carbon, particularly effective in the conversion of olefinic hydrocarbons to the lower boiling of the linear polymers thereof. Other objects and advantages of the invention will become apparent from the following description thereof.

In accordance with the invention an inorganic porous material is subjected to subatmospheric pressure in a closed vessel. While maintaining the reduced pressure, a compound of an element of group VIII of the periodic table capable of reduction by application of heat is deposited upon the supported material. The pressure is then raised to atmospheric or higher and thereafter again reduced to subatmospheric pressure, preferably not substantially in excess of about 150 mm. of mercury. While maintaining the reduced pressure, heat is applied to effect a gradual increase in the temperature of the mixture until a temperature of about 400° C. and preferably not substantially in excess of about 300° C. is attained; volatilized materials as well as gaseous decomposition products being meanwhile continuously removed from the vessel. When generation of decomposition products to any substantial degree has ceased the heating is discontinued. Thereupon the resulting catalyst is cooled while maintaining the subatmospheric pressure conditions.

In a preferred method of executing the invention the catalyst is prepared in a sealed rotating drum provided with means for heating and cooling its contents, removing volatilized materials therefrom and for varying the pressure therein. Although this type of apparatus is preferred, the use of others comprising stationary vessels is, however, comprised within the scope of the invention. The rotating type of apparatus is preferred not only because it enables the uniform distribution of the element of group VIII of the periodic table throughout the porous mass but because it enables the attainment of more effective mixing of the components without attrition to any substantial degree of the porous materials. It furthermore enables more uniform heating of the mixture, thereby providing more effective control of the rate of decomposition as well as the more efficient removal of decomposition products and volatilized materials from the mass under treatment.

In preparing the catalysts in accordance with the invention a suitable inorganic porous material, for example, a porous granular carbon material, such as the activated vegetable or animal charcoals as prepared and activated by various commercial suppliers, is introduced into a sealed vessel, preferably of the rotating type. Suction is thereupon applied to reduce the pressure within the vessel to subatmospheric pressure, for example, in the range of from about 1 to about 25 mm. of mercury. While maintaining the subatmospheric pressure a compound of an element of group VIII of the periodic table capable of undergoing decomposition under the application of heat is introduced into the vessel.

The form in which the compound of the element of group VIII is introduced into the vessel will depend upon the physical characteristics of the particular compound used as well as the nature of the catalyst ultimately desired. Thus, the compound may be introduced in the form of a suspension in a suitable liquid medium, or as a solution.

In the preparation of catalysts suitable for the conversion of olefinic hydrocarbons to the lower boiling of the linear polymers thereof at relatively low temperatures, it is preferred to utilize the salt of an element of group VIII, and an oxygen-containing mineral acid, for example, cobalt nitrate, as the starting material. When thus utilizing the nitrates it is preferred to introduce the salt in the form of a solution, for example, an aqueous solution, though solvents other than water may be used. The amount of salt introduced into the vessel is dependent upon the nature of the particular catalyst to be prepared. In the preparation of catalysts comprising cobalt in combination with carbon, particularly effective for the conversion of olefins, it is preferred to add a sufficient amount of the cobalt salt to the carbon to obtain a finished catalyst containing from about 3% to about 35%, and preferably from about 5% to about 25% of cobalt. Catalytic materials comprising higher or lower concentrations of cobalt depending upon the particular characteristics of the catalyst obtained may, however, be prepared in accordance with the process of the invention.

The concentration of the cobalt nitrate in the solution used as the starting material may vary within the scope of the invention. In general, it is preferred to employ a sufficient amount of solvent for the cobalt nitrate to immerse the greater part of the mass of charcoal. The mixture is then agitated, for example, by rotation of the drum, until intimate contact between the solution and charcoal has been established. The pressure in the drum is then increased to at least atmospheric pressure.

By this procedure impregnation of the cobalt nitrate into the inorganic porous material is obtained to the degree essential to the attainment of a catalyst possessing sufficiently high activity as well as the characteristics essential for its use in such processes as the conversion of olefinic hydrocarbons to the lower boiling of the linear polymers thereof. It has been found that such a method resulting in deep impregnation is particularly important when utilizing as the inorganic porous material, materials of such a highly hydrophobic nature as charcoal, where impregnation would not be attained to a sufficient extent by merely wetting it with the solution of the element of group VIII at atmospheric pressure. The invention is, however, not necessarily limited to this particular method of impregnating the porous support material and at times, depending upon the use to which the finished catalyst is to be put, it may be desirable to obtain the less active catalysts resulting from the mere impregnation of the porous material at atmospheric pressure before proceeding with the preparation in accordance with the invention.

After impregnation of the support material with the cobalt nitrate solution suction is again applied to the drum to reduce the pressure therein below atmospheric, and preferably below about 150 mm. of mercury. While maintaining the reduced pressure heat is applied to the vessel, which is preferably rotated during the process, to attain a gradual rise in the temperature of the contents without, however, occasioning any sudden substantial increase in temperature. During the heating the volatilized solvent will be constantly removed from the vessel as well as decomposition products comprising oxides of nitrogen resulting from the decomposition of the cobalt nitrate. It has been found that under these conditions gradual decomposition of a considerable portion of the cobalt nitrate will take place even before complete removal of the solvent has been accomplished. The heating is continued until a temperature not substantially in excess of about 400° C. and preferably about 300° C. is attained. A criterion of the rate of temperature increase is the volume of decomposition products eliminated from the vessel. Increments in heat input are applied when generation in any substantial amount of decomposition products has ceased, or, preferably, the rate of heating is so regulated to maintain a constant rate of evolution of the decomposition products. When the prescribed maximum temperature range is attained the heating is continued until generation of decomposition products is no longer ascertainable to any substantial extent.

While maintaining the subatmospheric pressure in the drum the contents are cooled, for example, to below about 50° C. and preferably to about room temperature, before raising the pressure therein by admission of air or other means. The catalyst may then be removed from the drum without any substantial deterioration of the catalyst upon contact with air or during storage.

Under these conditions of preparing the catalyst it has been found that spontaneous ignition to any substantial degree of even such compounds as cobalt nitrate, so deleterious to the activity of the finished catalyst, and which effect is inherent to a degree often preventing economical production of such catalysts by methods available heretofore, is completely avoided. The resulting catalysts are furthermore not only exceedingly uniform with respect to composition and activity but are unusually stable upon contact with the atmosphere and under storage conditions. The exact composition of the catalysts comprising the elements of group VIII in combination with carbon prepared in this manner and which are particularly effective for the conversion or treatment of olefinic hydrocarbons is not readily determined. The element of group VIII may be present therein in elementary form, in combination with oxygen or even in combination with carbon, or may comprise a mixture of these various forms. The carbon in the particular catalysts comprising this material in combination with an element of group VIII prepared in accordance with the method of the invention is not merely a diluent or support material but an active component of the catalyst, in the absence of which the catalytic effect upon such reactions as the conversion of normally gaseous olefinic hydrocarbons, particularly ethylene, to the lower boiling of the linear polymers thereof is only negligible, if not completely absent.

Materials capable of promoting or otherwise modifying the activity of the finished catalyst may be added thereto. Such materials comprising, for example, elements other than those of group VIII or compounds thereof, may be added in relatively small amounts to the materials in the drum during the course of manufacture. The porous material need not consist of a material of but one type and may comprise a mixture of two or more inorganic materials of porous structure. Thus, in the preparation of catalysts comprising one or more elements of group VIII in combination with carbon, inorganic material inert with respect to behavior of the catalyst such as for example pumice, crushed brick, bauxite, clays, etc., may be admixed with the charcoal prior to preparation of the catalyst or even during the course of its preparation.

Catalysts prepared in accordance with the above method possess appreciable activity and are ready to be utilized as such. If desired, however, the catalyst may be subjected to additional treatments culminating in still greater activity of the catalysts thus produced. Such additional treatments may comprise subjection of the catalyst to higher temperatures in the order of for example about 500° C. while sweeping with a gas consisting of or comprising hydrogen, nitrogen, normally gaseous paraffinic hydrocarbons, such as methane, ethane, propane, or mixtures thereof. A method particularly effective for further increasing the activity of the catalysts of the invention comprises their subjection to an elevated temperature up to, for example, about 500° C., while maintaining them at a subatmospheric pressure, preferably about 10 mm. mercury.

*Example I*

1300 grams of cocoanut charcoal was charged to a rotating drum and subjected to a subatmospheric pressure of 5 mm. mercury. While maintaining this subatmospheric pressure, 1286 grams of $Co(NO_3)_2 \cdot 6H_2O$ dissolved in 1229 grams of water was introduced into the drum. The drum was rotated to assure intimate mixing after which the pressure was raised to atmospheric. After a period of about 10 minutes suction was again applied to the vessel to reduce the pressure therein to 26 mm. mercury. Then while maintaining this subatmospheric pressure and rotating the drum heat was applied in such manner as to slowly raise the temperature of the contents to 300° C. This total heating period was eleven hours. The contents of the drum were then cooled to 40° C. while maintaining the subatmospheric pressure. Air was then allowed to enter the drum to attain atmospheric pressure and the catalyst was removed therefrom. During this method of preparation sudden rises in temperature indicative of spontaneous ignition of the cobalt nitrate were absent and a catalyst of exceptional uniformity of composition was attained.

140 cc. of the catalyst thus produced was placed in a tubular stainless steel reactor and flushed with nitrogen for a period of 3 hours at a temperature of 300° C. Ethylene was then passed over the catalyst at a temperature of 100° C. and at a pressure of 800 pounds at the rate of 942 grams of ethylene per liter of catalyst per hour. The operation was continued for a period of 16 hours. A conversion of ethylene to normally liquid polymers of 57% was still obtained during the last 4 hours of the total operating period. 56% of the polymer produced consisted of butylene.

*Example II*

A catalyst comprising cobalt in combination with activated carbon was prepared from cocoanut charcoal and cobalt nitrate under the conditions of Example I with the exception that the heating period was reduced to 10½ hours. No evidence of sudden temperature rise was noted during the production of the catalyst and a catalyst of exceptional uniformity of composition was obtained.

140 cc. of the catalyst thus produced was placed in a stainless steel tubular reactor and subjected to subatmospheric pressure of 1 mm. mercury for a period of 5 hours at a temperature of 500° C. The catalyst was cooled and ethylene passed through the reactor at a temperature of 100° C., under atmospheric pressure and at a flow rate of 500 grams of ethylene per liter of catalyst per hour. During a 2.8-hour period of operation 280 grams of liquid polymer was produced per liter of catalyst, 95% of which polymer was butylene.

I claim as my invention:

1. In the preparation of catalysts comprising cobalt and activated carbon particularly effective in the conversion of olefinic hydrocarbons to the lower boiling of the linear polymers thereof, the method of obtaining catalysts of substantially improved uniformity with respect to composition and catalytic activity which comprises admixing aqueous cobalt nitrate with activated carbon in a closed vessel, applying heat to the vessel under controlled conditions effecting a gradual increase in the temperature of the contents thereof up to about 400° C., removing volatilized materials and decomposition products from the vessel substantially as rapidly as formed therein, continuing the heating until evolution of any substantial amount of decomposition products has ceased, cooling the contents of the vessel, and maintaining a subatmospheric pressure below about 150 mm. of mercury in said vessel during said admixing, heating and cooling steps.

2. In the preparation of catalysts comprising cobalt and activated carbon particularly effective in the conversion of olefinic hydrocarbons to the lower boiling of the linear polymers thereof, the method of obtaining catalysts of substantially improved uniformity with respect to composition and catalytic activity which comprises admixing aqueous cobalt nitrate with activated carbon in a closed vessel, applying heat to the vessel under controlled conditions effecting a gradual increase in the temperature of the contents thereof up to about 400° C., removing volatilized materials and decomposition products from the vessel substantially as rapidly as formed therein, continuing the heating until evolution of any substantial amount of decomposition products has ceased, thereafter maintaining the contents of the vessel at a higher temperature not substantially in excess of about 500° C., cooling the contents of the vessel, and maintaining a subatmospheric pressure below about 150 mm. of mercury in said vessel during said admixing, heating and cooling steps.

3. In the preparation of catalysts comprising cobalt and activated carbon particularly effective in the conversion of olefinic hydrocarbons to the lower boiling of the linear polymers thereof, the method of obtaining catalysts of substantially improved uniformity with respect to composition and catalytic activity which comprises admixing an aqueous oxygen containing mineral acid salt of cobalt capable of undergoing substantial decomposition when subjected to heating at temperatures below about 400° C. with activated carbon in a closed vessel, applying heat to the vessel under controlled conditions effecting a gradual increase in the temperature of the contents thereof up to about 400° C., removing volatilized materials and decomposition products from the vessel substantially as rapidly as formed therein, continuing the heating until evolution of any substantial amount of decomposition products has ceased, cooling the contents of the vessel, and maintaining a subatmospheric pressure below about 150 mm. of mercury in said vessel during said admixing, heating and cooling steps.

4. In the preparation of catalysts comprising cobalt and activated carbon particularly effective in the conversion of olefinic hydrocarbons to the lower boiling of the linear polymers thereof, the method of obtaining catalysts of substantially improved uniformity with respect to composition and catalytic activity which comprises admixing an aqueous oxygen-containing mineral acid salt of cobalt capable of undergoing substantial decomposition when subjected to heating at temperatures below about 400° C. with activated carbon in a closed vessel, applying heat to the vessel under controlled conditions effecting a gradual increase in the temperature of the contents thereof up to about 400° C., removing volatilized materials and decomposition products from the vessel substantially as rapidly as formed therein, continuing the heating until evolution of any substantial amount of decomposition products has ceased, thereafter maintaining the contents of the vessel at a higher temperature not substantially in excess of about 500° C., cooling the contents of the vessel and maintaining a subatmospheric pressure below about 150 mm. of mercury in said vessel during said admixing, heating and cooling steps.

5. In the preparation of catalysts comprising a metal selected from the group consisting of cobalt and nickel and activated carbon particularly effective in the conversion of olefinic hydrocarbons to the lower boiling of the linear polymers thereof, the method of obtaining catalysts of substantially improved uniformity with respect to composition and catalytic activity which comprises admixing an aqueous solution of a nitrate of a metal selected from the group consisting of cobalt and nickel with activated carbon in a closed vessel, applying heat to the vessel under controlled conditions effecting a gradual increase in the temperature of the contents thereof up to about 400° C., removing volatilized materials and decomposition products from the vessel substantially as rapidly as formed therein, continuing the heating until evolution of any substantial amount of decomposition products has ceased, cooling the contents of the vessel, and maintaining a subatmospheric pressure below about 150 mm. of mercury in said vessel during said admixing, heating and cooling steps.

6. In the preparation of catalysts comprising a metal selected from the group consisting of cobalt and nickel and activated carbon particularly effective in the conversion of olefinic hydrocarbons to the lower boiling of the linear polymers thereof, the method of obtaining catalysts of substantially improved uniformity with respect to composition and catalytic activity which comprises admixing an aqueous solution of a nitrate of a metal selected from the group consisting of cobalt and nickel with activated carbon in a closed vessel, applying heat to the vessel under controlled conditions effecting a gradual increase in the temperature of the contents thereof up to about 400° C., removing volatilized materials and decomposition products from the vessel substantially as rapidly as formed therein, continuing the heating until evolution of any substantial amount of decomposition products has ceased, thereafter maintaining the contents of the vessel at a higher temperature not substantially in excess of about 500° C., cooling the contents of the vessel and maintaining a subatmospheric pressure below about 150 mm. of mercury in said vessel during said admixing, heating and cooling steps.

7. In the preparation of catalysts comprising a metal selected from the group consisting of cobalt and nickel and activated carbon particularly effective in the conversion of olefinic hydrocarbons to the lower boiling of the linear polymers thereof, the method of obtaining catalysts of substantially improved uniformity with respect to composition and catalytic activity which comprises admixing an aqueous oxygen-containing mineral acid salt of a metal selected from the group consisting of cobalt and nickel capable of undergoing decomposition at a temperature below about 400° C. with activated carbon in a closed vessel, applying heat to the vessel under controlled conditions effecting a gradual increase in the temperature of the contents thereof up to about 400° C., removing volatilized materials and decomposition products from the vessel substantially as rapidly as formed therein, continuing the heating until evolution of any substantial amount of decomposition products has ceased, cooling the contents of the vessel, and maintaining a subatmospheric pressure below about 150 mm. of mercury in said vessel during said admixing, heating and cooling steps.

8. In the preparation of catalysts comprising a metal selected from the group consisting of cobalt and nickel and activated carbon particularly effective in the conversion of olefinic hydrocarbons to the lower boiling of the linear polymers thereof, the method of obtaining catalysts of substantially improved uniformity with respect to composition and catalytic activity which comprises admixing an aqueous oxygen-containing mineral acid salt of a metal selected from the group consisting of cobalt and nickel capable of undergoing decomposition at a temperature below about 400° C. with activated carbon in a closed vessel, applying heat to the vessel under controlled conditions effecting a gradual increase in the temperature of the contents thereof up to about 400° C., removing volatilized materials and decomposition products from the vessel substantially as rapidly as formed therein, continuing the heating until evolution of any substantial amount of decomposition products has ceased, thereafter maintaining the contents of the vessel at a higher temperature not substantially in excess of about 500° C., cooling the contents of the vessel and maintaining a subatmospheric pressure below about 150 mm. of mercury in said vessel during said admixing, heating and cooling steps.

HARRY A. CHENEY.